United States Patent
Zheng et al.

(10) Patent No.: US 10,220,950 B2
(45) Date of Patent: Mar. 5, 2019

(54) ENGINE MOUNT WAITING FAIL SAFE LUG JOINT WITH REDUCED DYNAMIC AMPLIFICATION FACTOR

(71) Applicant: UNITED TECHNOLOGIES CORPORATION, Farmington, CT (US)

(72) Inventors: Zhijun Zheng, Avon, CT (US); Joseph P. Foster, Glastonbury, CT (US); Stephen P. Dailey, Ellington, CT (US); David F. Sandy, Milford, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 517 days.

(21) Appl. No.: 14/769,336

(22) PCT Filed: Mar. 4, 2014

(86) PCT No.: PCT/US2014/020264
§ 371 (c)(1),
(2) Date: Aug. 20, 2015

(87) PCT Pub. No.: WO2014/189588
PCT Pub. Date: Nov. 27, 2014

(65) Prior Publication Data
US 2015/0375867 A1 Dec. 31, 2015

Related U.S. Application Data

(60) Provisional application No. 61/790,946, filed on Mar. 15, 2013.

(51) Int. Cl.
*B64D 27/26* (2006.01)
*F02C 7/20* (2006.01)
(Continued)

(52) U.S. Cl.
CPC ............ *B64D 27/26* (2013.01); *F01D 25/24* (2013.01); *F01D 25/28* (2013.01); *F02C 7/20* (2013.01);
(Continued)

(58) Field of Classification Search
CPC ...... F01D 25/24; F01D 25/28; F05D 2220/32; F05D 2230/60; F05D 2240/90;
(Continued)

(56) References Cited

U.S. PATENT DOCUMENTS 2,986,930 A   6/1961   Price
4,742,975 A   5/1988   Pachomoff et al.
(Continued)

FOREIGN PATENT DOCUMENTS

EP   0249553 A1   12/1987
EP   0564126 A1   10/1993
(Continued)

OTHER PUBLICATIONS

International Search Report Application No. PCT/US2014/020264, dated Dec. 12, 2014.
(Continued)

*Primary Examiner* — Mark Laurenzi
*Assistant Examiner* — Shafiq Mian
(74) *Attorney, Agent, or Firm* — Cantor Colburn LLP

(57) ABSTRACT

An engine mount may include a clevis and a lug defining a hole therethrough. A pin may be joined to the clevis and may extend through the hole of the lug with the pin and the lug defining a clearance therebetween. A trigger system may be disposed on the lug and operatively associated with the pin.

20 Claims, 4 Drawing Sheets

(51) Int. Cl.
*F01D 25/24* (2006.01)
*F01D 25/28* (2006.01)
*F16B 5/02* (2006.01)

(52) U.S. Cl.
CPC .. *B64D 2027/266* (2013.01); *B64D 2027/268* (2013.01); *F05D 2220/32* (2013.01); *F05D 2230/60* (2013.01); *F05D 2230/642* (2013.01); *F05D 2240/90* (2013.01); *F05D 2260/311* (2013.01); *F16B 5/025* (2013.01); *Y02T 50/44* (2013.01); *Y02T 50/671* (2013.01)

(58) Field of Classification Search
CPC ........ F16M 13/02; B64D 27/26; B64D 27/16; B64D 2027/26
See application file for complete search history.

(56) References Cited

U.S. PATENT DOCUMENTS

| | | | |
|---|---|---|---|
| 4,997,145 A | 3/1991 | Hodgkinson | |
| 5,275,357 A * | 1/1994 | Seelen | B64D 27/26 244/54 |
| 5,649,417 A | 7/1997 | Hey | |
| 5,873,547 A * | 2/1999 | Dunstan | B64D 27/18 244/54 |
| 5,921,500 A * | 7/1999 | Ellis | B64D 27/20 244/54 |
| 6,059,227 A | 5/2000 | Le Blaye et al. | |
| 6,330,995 B1 * | 12/2001 | Mangeiga | B64D 27/26 244/54 |
| 6,843,449 B1 * | 1/2005 | Manteiga | B64D 27/26 244/54 |
| 7,909,302 B2 * | 3/2011 | Audart-Noel | B64D 27/26 244/54 |
| 8,074,923 B2 * | 12/2011 | Foster | B64D 27/26 244/54 |
| 2008/0230675 A1 | 9/2008 | Audart-Noel et al. | |
| 2009/0184197 A1 * | 7/2009 | Cloft | B64D 27/26 244/54 |
| 2009/0308078 A1 * | 12/2009 | Foster | B64D 27/26 60/796 |
| 2010/0170980 A1 * | 7/2010 | Haramburu | B64D 27/26 244/54 |
| 2010/0181419 A1 | 7/2010 | Haramburu et al. | |
| 2013/0193298 A1 * | 8/2013 | Sandy | B64D 27/26 248/554 |
| 2014/0061375 A1 * | 3/2014 | Sandy | B64D 27/26 244/54 |
| 2014/0061426 A1 * | 3/2014 | Zheng | B64D 27/26 248/554 |

FOREIGN PATENT DOCUMENTS

| | | |
|---|---|---|
| EP | 1561684 A2 | 8/2005 |
| JP | 2005-320971 A | 11/2005 |
| KR | 10-2012-0076095 A | 7/2012 |
| WO | 2009007354 A1 | 1/2009 |

OTHER PUBLICATIONS

European Search Report for Application No. 14801436.8; dated Oct. 20, 2016.

* cited by examiner

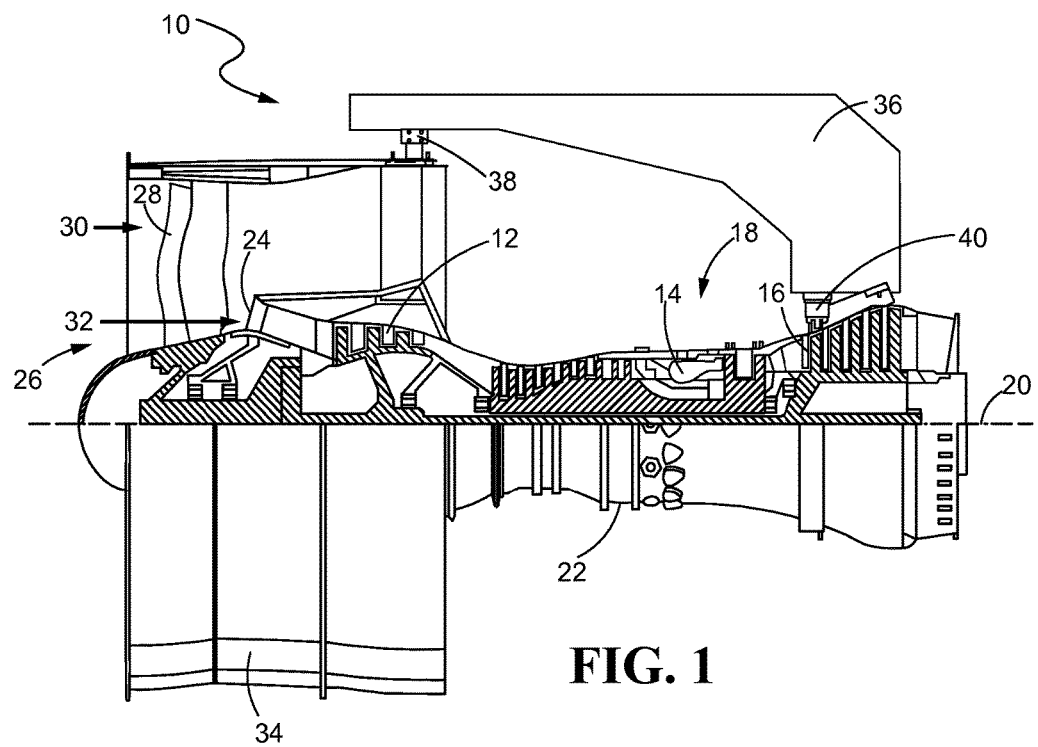
FIG. 1
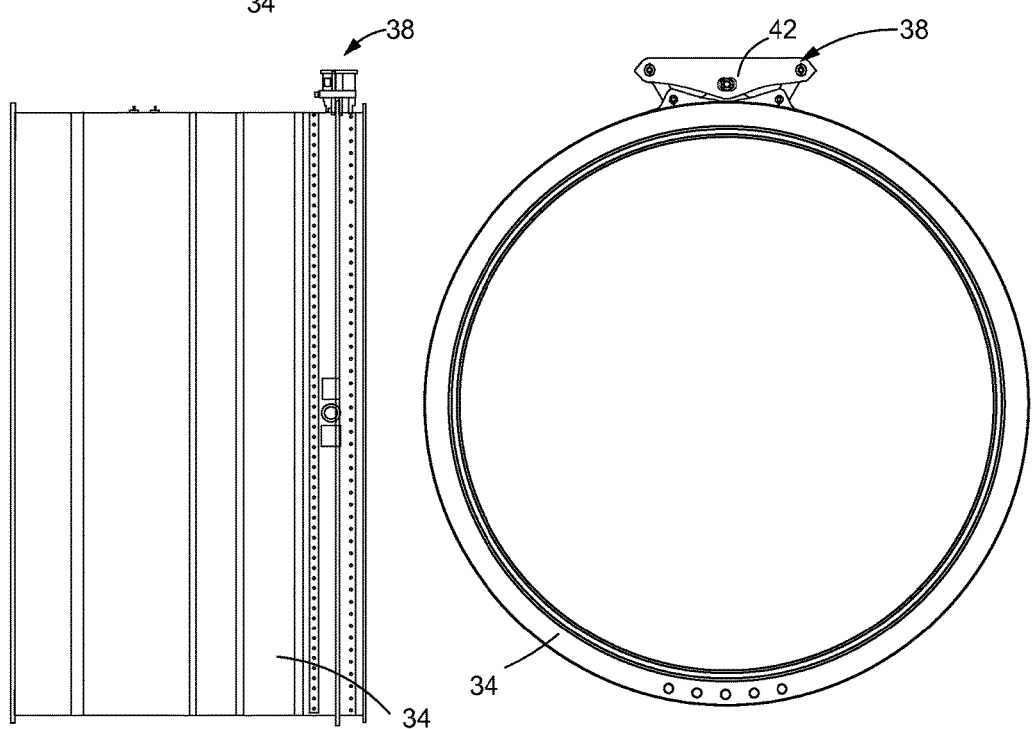
FIG. 2  FIG. 3

ENGINE MOUNT WAITING FAIL SAFE LUG JOINT WITH REDUCED DYNAMIC AMPLIFICATION FACTOR

CROSS-REFERENCE TO RELATED APPLICATIONS

This patent application is a 35 USC § 371 US national stage filing of International Patent Application No. PCT/US2014/020264 filed on Mar. 4, 2014, and claims priority under 35 USC § 119(e) to U.S. Provisional Patent Application Ser. No. 61/790,946, filed on Mar. 15, 2013.

TECHNICAL FIELD

The subject matter of the present disclosure relates generally to gas turbine engines and, more particularly, relates to waiting fail safe lugs for engine mounts.

BACKGROUND

Various engine mounting systems are used to mount gas turbine engines to aircraft. Typically, gas turbine engines are mounted to the wing, fuselage, or tail of an aircraft and may be mounted at various positions between its forward and aft ends. The engine mounts carry various loads to the aircraft such as vertical loads from the engine weight, axial loads due to the thrust generated by the engine, lateral loads from wind buffeting, and roll loads caused from rotary operation of the engine. In addition to carrying these loads, the engine mounts must also withstand both the axial and radial thermal expansion and contraction of the engine during operation.

For example, a front engine mount having a pair of circumferentially spaced apart primary links is one type of mount utilized in conventional engine mounting systems. Each primary link is joined at one end to the aircraft and at the other end to an engine casing, such as the fan case. The front engine mount, as well as aft mounts and other mounts within the engine mounting system, typically incorporates a waiting fail safe system to provide a redundant load path in case the primary load path fails. The waiting fail safe load path does not engage under the normal or limit maneuver load condition.

In the case of these types of front engine mounts, the waiting fail safe system is positioned in between the two primary links. In the event that either primary link fails, the waiting fail safe system is engaged. While effective, the waiting fail safe system of previous designs does not, when engaged, prevent the engine from upward or downward movement due to subsequent vertical loads. The kinetic energy associated with the upward or downward movement will result in an impact force that is higher than the design load, which is determined by the equilibrium under the assumption of static determination. Typically, to account for this potential impact force, a dynamic amplification factor is applied to the static load, as well as fatigue spectrum, to ensure the waiting fail safe system has adequate capability. However, incorporating the dynamic amplification factor into the design results in a higher design load for the waiting fail safe system, and hence contributes to added weight.

There is a need for improved waiting fail safe systems.

SUMMARY

In accordance with an aspect of the disclosure, an engine mount for mounting a case of a gas turbine engine to an aircraft pylon is provided. The engine mount may include a clevis and a lug defining a hole therethrough. A pin may be joined to the clevis and may extend through the hole of the lug with the pin and the lug defining a clearance therebetween. A trigger system may be disposed on the lug and operatively associated with the pin.

In accordance with another aspect of the disclosure, the trigger system may include a trigger, a spring, a slider block and a channel.

In accordance with yet another aspect of the disclosure, the trigger may include a straight portion and an arcuate portion. The straight portion may include an activating nub and the arcuate portion may include a locking catch.

In accordance with still another aspect of the disclosure, the activating nub may be operatively engageable with the pin.

In accordance with still yet another aspect of the disclosure, the slider block may be slidable within the channel and may be engageable with the pin.

In further accordance with another aspect of the disclosure, the slider block may include a notch which may be operatively engageable with the locking catch.

In further accordance with still another aspect of the disclosure, the spring may be disposed within the channel. The spring may be operatively connected at one end to the slider block and may be operatively connected at another end to an end wall of the channel.

In even further accordance with still another aspect of the disclosure, the trigger system may be movable between a disengaged position and an engaged position in contact with the pin.

In accordance with another aspect of the disclosure, an assembly for a gas turbine engine is provided. The assembly may include a case. At least a first engine mount may be secured to the case. At least a first lug may be joined to the case. The at least first lug may define a hole therethrough. At least a first pin may be joined to the at least first engine mount. The at least first waiting fail safe pin may extend through the hole of the at least first lug with the at least first pin and the at least first lug defining a clearance therebetween. A trigger system may be disposed on the at least first lug and may be operatively associated with the at least first pin.

In accordance with yet another aspect of the disclosure, the activating nub may be operatively engageable with the at least first pin.

In accordance with still another aspect of the disclosure, the slider block may be slidable within the channel and may be engageable with the at least first pin.

In accordance with still yet another aspect of the disclosure, the at least first engine mount may include a mount beam. A first and second mount link may each be joined at one end to the mount beam and joined at another end to respective first and second mount lugs, which may be joined to the case.

In further accordance with yet another aspect of the disclosure, the at least first waiting fail safe lug may be disposed on the case between the first and second mount lugs.

In accordance with another aspect of the disclosure, a method of configuring an engine mount for a gas turbine engine is provided. The method entails mechanically coupling a trigger system to a lug of a fan case with the trigger system configured for selective engagement of a pin coupled to the engine mount.

In accordance with yet another aspect of the disclosure, the method may include the trigger system with a trigger, a spring, a slider block and a channel.

In accordance with still yet another aspect of the disclosure, the method may include the trigger with an activating nub configured to initiate movement of the trigger system from a disengaged position to an engaged position when the pin contacts the activating nub.

In further accordance with yet another aspect of the disclosure, the method may include the slider block configured for selective contact with the pin and defines a notch for operative engagement with the trigger.

In even further accordance with yet another aspect of the disclosure, the method may include the trigger system preventing subsequent movement of the pin when the trigger system is moved to an engaged position.

Other aspects and features of the disclosed systems and methods will be appreciated from reading the attached detailed description in conjunction with the included drawing figures. Moreover, selected aspects and features of one example embodiment may be combined with various selected aspects and features of other example embodiments.

BRIEF DESCRIPTION OF THE DRAWINGS

For further understanding of the disclosed concepts and embodiments, reference may be made to the following detailed description, read in connection with the drawings, wherein like elements are numbered alike, and in which:

FIG. 1 is a schematic side view of a gas turbine engine with portions of the nacelle thereof sectioned and broken away to show details of the present disclosure;

FIG. 2 is a side view of a fan case with an engine mount, constructed in accordance with the teachings of this disclosure;

FIG. 3 is a front view of a fan case with an engine mount, constructed in accordance with this disclosure;

Figure 4:
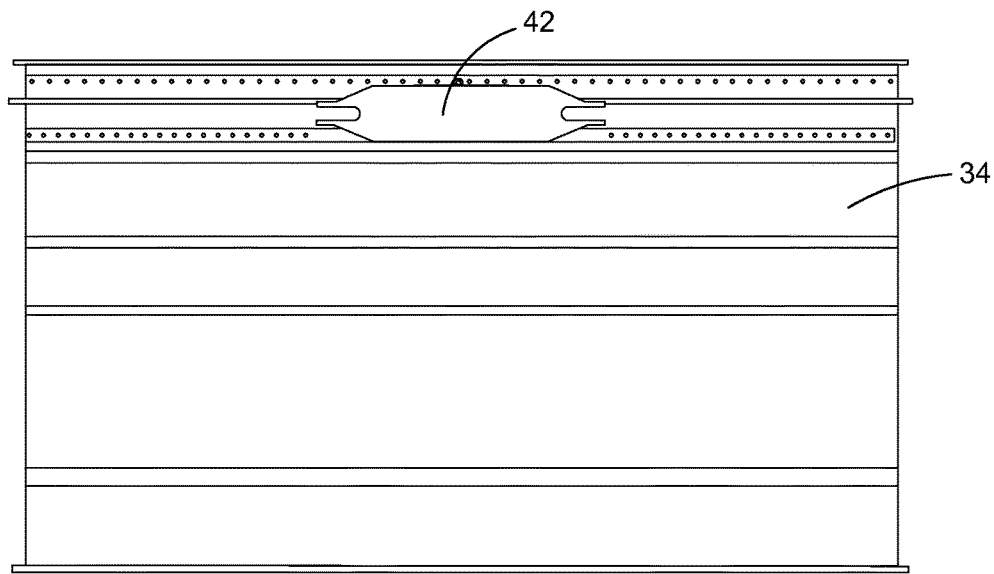
FIG. 4 is a top view of a fan case with an engine mount, constructed in accordance with this disclosure.

It is to be noted that the appended drawings illustrate only certain illustrative embodiments and are therefore not to be considered limiting with respect to the scope of the disclosure or claims. Rather, the concepts of the present disclosure may apply within other equally effective embodiments. Moreover, the drawings are not necessarily to scale, emphasis generally being placed upon illustrating the principles of certain embodiments.

DETAILED DESCRIPTION

Referring now to FIG. 1, a gas turbine engine constructed in accordance with the present disclosure is generally referred to by reference numeral 10. The gas turbine engine 10 includes a compressor 12, a combustor 14 and a turbine 16. The serial combination of the compressor 12, the combustor 14 and the turbine 16 is commonly referred to as a core engine 18. The core engine 18 lies along a longitudinal central axis 20. A core engine case 22 surrounds the core engine 18.

Air enters compressor 12 at an inlet 24 and is then pressurized. The pressurized air subsequently enters the combustor 14. In the combustor 14, the air mixes with fuel and is burned, generating hot combustion gases that flow downstream to the turbine 16. The turbine 16 extracts energy from the hot combustion gases to drive the compressor 12 and a fan 26 having airfoils 28. As the turbine 16 drives the fan 26, the airfoils 28 rotate so as to take in ambient air. This process accelerates the ambient air flow 30 to provide the majority of the useful thrust produced by the engine 10. Generally, in modern gas turbine engines, the fan 26 has a much greater diameter than the core engine 18. Because of this, the ambient air flow 30 through the fan 26 can be 5-10 times higher, or more, than the combustion air flow 32 through the core engine 18. The ratio of ambient air flow 30 through the fan 26 relative to the combustion air flow 32 through the core engine 18 is known as the bypass ratio.

Figure 5:
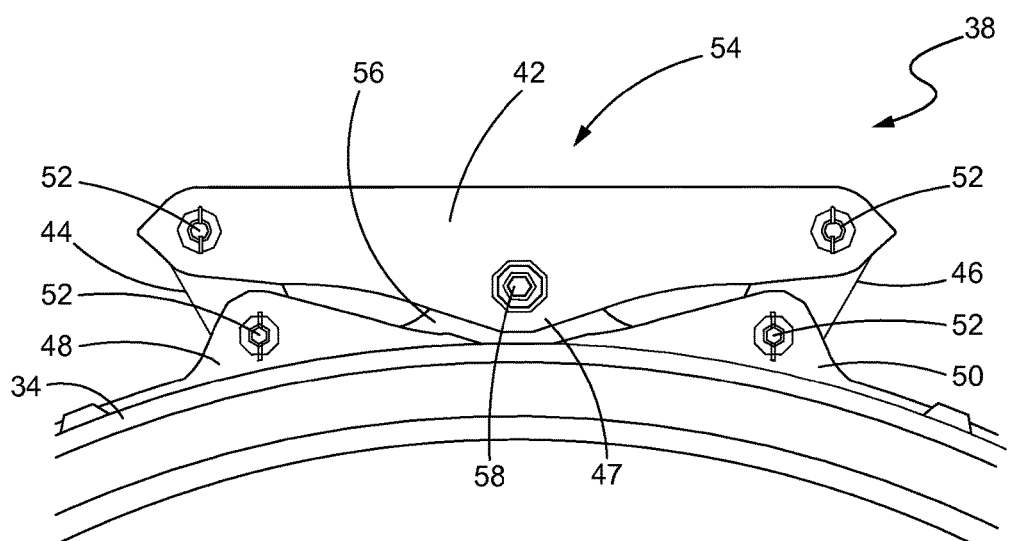
FIG. 5 is a front view of an engine mount, constructed in accordance with this disclosure.
Figure 6:
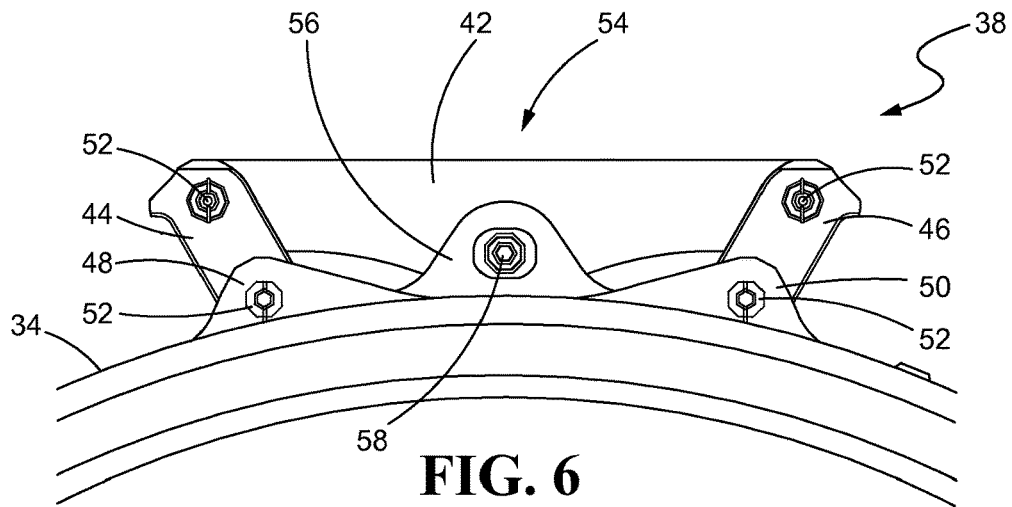
FIG. 6 is a front view of an engine mount with portions sectioned and broken away to show details of the present disclosure.

An annular fan case 34 surrounds the fan 26. The engine 10 may be mounted to an aircraft pylon 36 by a forward mount 38 and an aft mount 40. As seen in FIGS. 1-6, the forward mount 38 may be disposed on the fan case 34 at a location that facilities joining to the aircraft pylon 36. Similarly, the aft mount 40 may be disposed on the core engine case 22 at a location that facilitates joining to the aircraft pylon 36. As best seen in FIGS. 5-6, the forward mount 38 may include a forward mount beam 42, which may include first and second primary forward mount links 44, 46. The forward mount 38 may also include a substantially centrally located clevis 47, which extends radially inwardly. The forward mount beam 42 may be secured to the aircraft pylon 36 by a conventional means such as but not limited to bolts and nuts. Each link 44, 46 may be joined at one end to the forward mount beam 42 and joined at the other end to complimentary first and second primary forward mount lugs 48, 50, respectively. Each primary forward mount lug 48, 50 may be disposed onto the fan case 34 by a conventional means such as, but not limited to, welding. The links 44, 46 may be joined to forward mount beam 42 and respective primary forward mount lugs 48, 50 by conventional bolts and nuts 52, so as to create a primary load path for carrying the vertical load of the engine under normal (non-failure) conditions.

Figure 7:
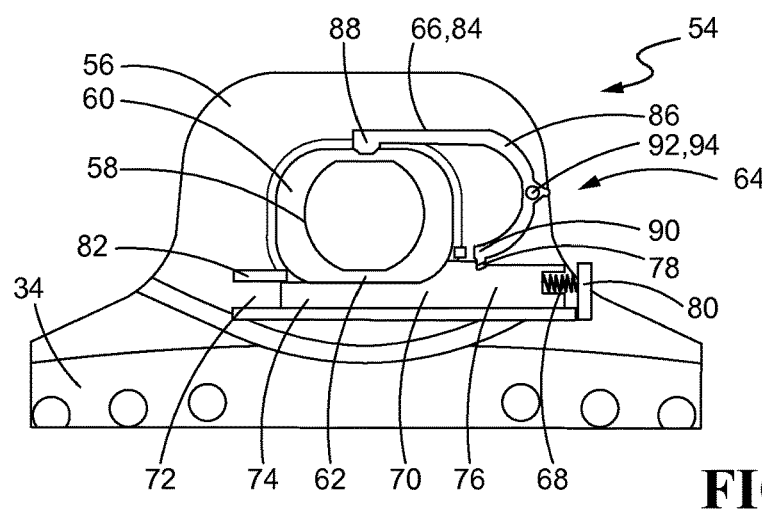
FIG. 7 is a detailed front view of a waiting fail safe system in a disengaged position, constructed in accordance with this disclosure.
Figure 8:
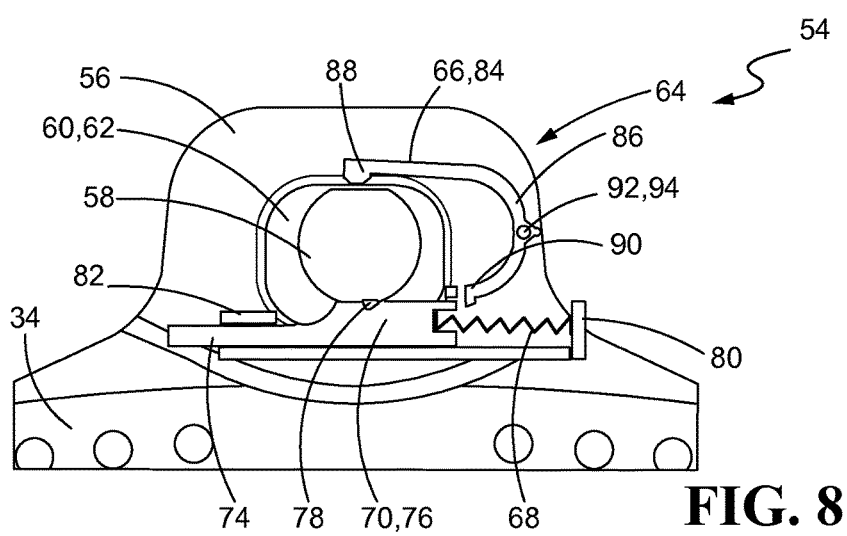
FIG. 8 is a detailed front view of a waiting fail safe system in an engaged position, constructed in accordance with this disclosure.

As seen best with more detail in FIGS. 7-8, the forward mount 38 of FIG. 6, which depicts a portion of clevis 47 removed to show the waiting fail safe lug 56, may also include a waiting fail safe system 54. The waiting fail safe system 54 may include a waiting fail safe lug 56 and a waiting fail safe pin 58. The waiting fail safe pin 58 may be joined to the clevis 47. The waiting fail safe lug 56 may be disposed on the fan case 34 between the first and second primary forward mount lugs 48, 50. The waiting fail safe lug 56 may include a pin hole 60 for receiving the waiting fail safe pin 58. When the waiting fail safe system 54 is disengaged (operating under non-failure conditions) the waiting fail safe pin 58 does not contact the waiting fail safe lug 56 within the pin hole 60, but instead, has a clearance 62, which maintains a substantially circumferential space between the waiting fail safe pin 58 and the waiting fail safe lug 56. The clearance 62 may be achieved due to the diameter of the pin hole 60 being suitably larger than the outside diameter of the waiting fail safe pin 58 and due to the design length of the first and second primary forward mount links 44, 46, which carry the engine load under non-failure conditions. Moreover, the clearance 62 is sized by a number of factors including, but not limited to, the tolerance, the thermal operating conditions, and the mechanical load of the engine, to ensure the waiting fail safe lug 56 does not carry any load under non-failure conditions.

Furthermore, the waiting fail safe lug 56 may include a trigger system 64. The trigger system 64 may include a J-shaped trigger 66, a spring 68, and a slider block 70, which may slide operatively along a channel 72 in a direction that is substantially perpendicular to the longitudinal central axis 20 (shown in FIG. 1). The slider block 70 may be substantially rectangular in shape and may include a narrow portion 74 and a clearance-filling portion 76, which may have a notch 78. The channel 72 may include an end wall 80 at one end and an open guide portion 82 at the opposite end. Moreover, the channel 72 may be formed on the waiting fail safe lug 56 at a position that may be between the pin hole 60 and the fan case 34. When the waiting fail safe system 54 is disengaged (as shown in FIG. 7), the slider block 70 may be oriented within the channel 72 so that the clearance-filling portion 76 may be adjacent to the end wall 80 and the narrow portion 74 may be adjacent to the open guide portion 82. The spring 68 may be disposed within the channel 72 and may be operatively connected at one end to the end wall 80 and at the opposite end to the clearance-filling portion 76.

The J-shaped trigger 66 may be formed of a straight portion 84 and an arcuate portion 86. An activating nub 88 may be located at the end of the straight portion 84 and a locking catch 90 may be located at the end of the arcuate portion 86. The arcuate portion 86 may include a pivot section 92, which may be pivotally joined to the waiting fail safe lug 56 via a pin 94 so that the trigger 66 operatively pivots.

In the disengaged condition of the waiting fail safe system 54, the locking catch 90 of the trigger 66 may operatively fit into the notch 78 of the clearance-filling portion 76 so that the slider block 70 may be locked into a position adjacent to the end wall 80 of the channel 72 maintaining the spring 68 in a compressed state.

In the event of a primary mounting component failure, such as a failure in the primary forward mount links 44,46, the primary forward mount lugs 48,50, or the bolts and nuts 52, the engine 10 load will shift and the waiting fail safe system 54 will become engaged to alternatively carry the load that was once carried by the primary mounting components. In particular, the shifting of the engine 10 will cause the waiting fail safe pin 58 to engage with the activating nub 88 causing the trigger 66 to pivot at the pivot section 92. Simultaneously, as the trigger 66 pivots, the locking catch 90 disengages from the notch 78 and the spring 68 uncoils causing the slider block 70 to slide along the channel 72 so that the clearance-filling portion 76 contacts the waiting fail safe pin 58 and closes the clearance 62, as shown in FIG. 7. Accordingly, the clearance-filling portion 76 firmly forces, and securely maintains, the waiting fail safe pin 58 into contact with the surface of the pin hole 60. In this engaged position, the waiting fail safe system 54 will effectively carry the load level as determined by the static equilibrium. As such, the waiting fail safe system 54 mitigates initial dynamic amplification factor and also restricts repeated dynamic amplification factor by ensuring the engine will not move due to subsequent vertical loads.

Figure 9:
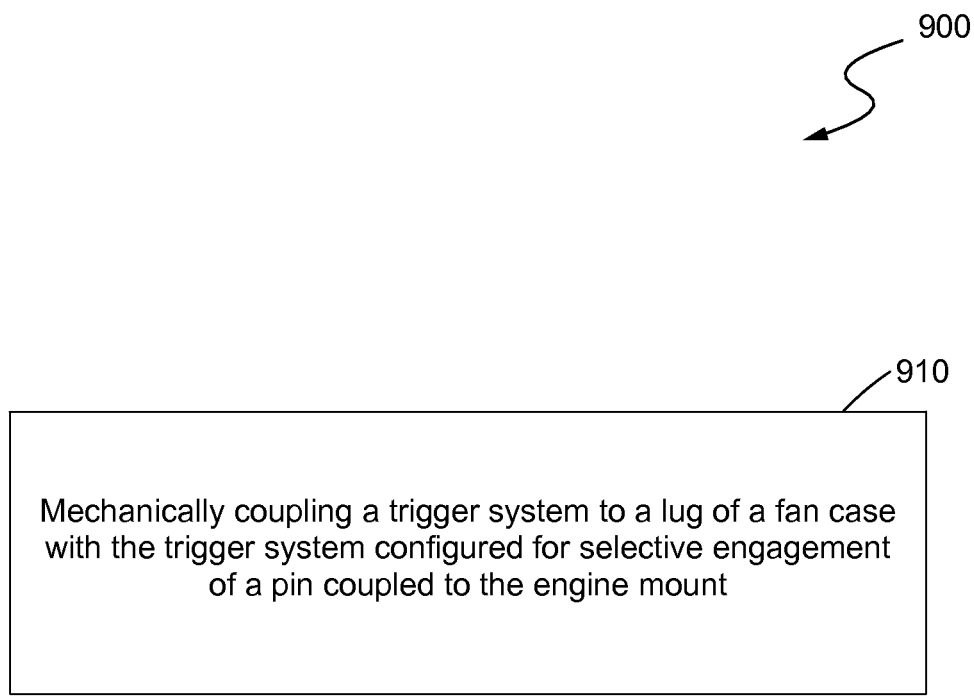
FIG. 9 is a flowchart illustrating a method of the present disclosure.

FIG. 9 illustrates a flowchart 900 of a method of configuring an engine mount for a gas turbine engine. Box 910 shows the step of mechanically coupling a trigger system to a lug of a fan case with the trigger system configured for selective engagement of a pin coupled to the engine mount. The trigger system may include a trigger, a spring, a slider block and a channel. The trigger may include an activating nub configured to initiate movement of the trigger system from a disengaged position to an engaged position when the pin contacts the activating nub. The slider block may be configured for selective contact with the pin and may define a notch for operative engagement with the trigger. The trigger system may prevent subsequent movement of the pin when the trigger system is moved to an engaged position.

Although the waiting fail safe system 54 with the trigger system 64 was described in regards to the forward mount 38, it should be understood that the waiting fail safe system 54 with the trigger system 64 equally applies to other mounting systems, including the aft mount 40 described above, for mounting gas turbine engines to fuselages, wings or tails of aircrafts.

While the present disclosure has shown and described details of exemplary embodiments, it will be understood by one skilled in the art that various changes in detail may be effected therein without departing from the spirit and scope of the disclosure as defined by claims supported by the written description and drawings. Further, where these exemplary embodiments (and other related derivations) are described with reference to a certain number of elements it will be understood that other exemplary embodiments may be practiced utilizing either less than or more than the certain number of elements.

INDUSTRIAL APPLICABILITY

Based on the foregoing, it can be seen that the present disclosure sets forth an engine mount including a waiting fail safe system with a trigger system for a gas turbine engine. The teachings of this disclosure can be employed to reduce the dynamic amplification factor of a waiting fail safe system of an engine mount for a gas turbine engine. Specifically, the reduction of the dynamic amplification factor reduces the design load for the waiting fail safe system of the present disclosure and also contributes to overall engine weight reduction. Furthermore, in the event the primary load paths of the engine mount fail the waiting fail safe system with the trigger system will provide an alternative load path while at the same time preventing the engine from movement due to subsequent vertical loads.

What is claimed is:

1. An engine mount for mounting a case of a gas turbine engine to an aircraft pylon, the engine mount comprising:
   a clevis;
   a lug defining a hole therethrough;
   a pin joined to the clevis and extending through the hole of the lug, wherein an outer dimension of the pin is less than a dimension of the hole such that a clearance is defined between the outer dimension of the pin and the hole; and
   a trigger system disposed on the lug and operatively associated with the pin, wherein the trigger system when actuated by movement of the pin supports the pin by extending into the clearance, which causes the pin to contact a portion of the hole.

2. The engine mount of claim 1, wherein the trigger system includes a trigger, a spring, a slider block and a channel.

3. The engine mount of claim 2, wherein the trigger includes a straight portion and an arcuate portion, the straight portion includes an activating nub, and the arcuate portion includes a locking catch.

4. The engine mount of claim 3, wherein the activating nub is operatively engageable with the pin.

5. The engine mount of claim 2, wherein the slider block is slidable within the channel and engageable with the pin.

6. The engine mount of claim 3, wherein the slider block includes a notch which is operatively engageable with the locking catch.

7. The engine mount of claim 6, wherein the spring is disposed within the channel operatively connected at one end to the slider block and operatively connected at another end to an end wall of the channel.

8. The engine mount of claim 1, wherein the trigger system is movable between a disengaged position and an engaged position in contact with the pin.

9. An assembly for a gas turbine engine, the assembly comprising:
- a case;
- at least a first engine mount secured to the case;
- at least a first lug joined to the case, the at least first lug defining a hole therethrough;
- at least a first pin joined to the at least first engine mount and extending through the hole of the at least first lug, wherein an outer dimension of the at least first pin is less than a dimension of the hole such that a clearance is defined between the outer dimension of the at least first pin and the hole; and
- a trigger system disposed on the at least first lug and operatively associated with the at least first pin, wherein the trigger system when actuated by movement of the pin supports the pin by extending into the clearance, which causes the pin to contact a portion of the hole.

10. The assembly of claim 9, wherein the trigger system includes a trigger, a spring, a slider block and a channel.

11. The assembly of claim 10, wherein the trigger includes a straight portion and an arcuate portion, the straight portion includes an activating nub, and the arcuate portion includes a locking catch.

12. The assembly of claim 11, wherein the activating nub is operatively engageable with the at least first pin.

13. The assembly of claim 10, wherein the slider block is slidable within the channel and engageable with the at least first pin.

14. The assembly of claim 11, wherein the slider block includes a notch which is operatively engageable with the locking catch.

15. The assembly of claim 9, wherein the at least first engine mount includes a mount beam, a first and second mount link each joined at one end to the mount beam and joined at another end to respective first and second mount lugs, which are joined to the case.

16. A method of operating a trigger system of an engine mount for a gas turbine engine, comprising:
mechanically coupling the trigger system to a lug of a fan case, wherein the trigger system removes a clearance between a hole of the lug and an outer surface of the pin when the pin contacts a portion of the trigger system, wherein the clearance is defined between the outer surface of the pin and a surface of the hole when the pin is inserted into the hole and the trigger system when actuated by movement of the pin causes a portion of the trigger system to extend into the clearance such that the pin contacts a portion of the hole.

17. The method of claim 16, wherein the trigger system includes a trigger, a spring, a slider block and a channel.

18. The method of claim 17, wherein the trigger includes an activating nub that initiates movement of the trigger system from a disengaged position to an engaged position when the pin contacts the activating nub.

19. The method of claim 18, wherein the slider block is configured for selective contact with the pin and defines a notch for operative engagement with the trigger.

20. The method of claim 16, wherein the trigger system prevents subsequent movement of the pin when the trigger system is moved to an engaged position.

* * * * *